United States Patent
Greve et al.

(10) Patent No.: US 10,232,462 B2
(45) Date of Patent: Mar. 19, 2019

(54) SPOT WELDING

(71) Applicant: GM Global Technology Operations LLC, Detroit, MI (US)

(72) Inventors: Bruce N. Greve, Clarkston, MI (US); Pamela L. Mabery, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 399 days.

(21) Appl. No.: 15/057,696

(22) Filed: Mar. 1, 2016

(65) Prior Publication Data
US 2017/0252852 A1    Sep. 7, 2017

(51) Int. Cl.
| F16B 5/08 | (2006.01) |
| B23K 11/18 | (2006.01) |
| B23K 11/11 | (2006.01) |
| B23K 11/16 | (2006.01) |
| B23K 103/10 | (2006.01) |
| B23K 103/16 | (2006.01) |
| F16B 11/00 | (2006.01) |

(52) U.S. Cl.
CPC .......... B23K 11/185 (2013.01); B23K 11/115 (2013.01); B23K 11/163 (2013.01); F16B 5/08 (2013.01); B23K 2103/10 (2018.08); B23K 2103/172 (2018.08); F16B 11/006 (2013.01)

(58) Field of Classification Search
CPC . B23K 11/115; B23K 11/185; B23K 2203/10; F16B 5/08; Y10T 403/478; Y10T 403/479
See application file for complete search history.

(56) References Cited

U.S. PATENT DOCUMENTS

2009/0294411 A1* 12/2009 Khakhalev ............ B23K 11/115
                                                                    219/117.1
2010/0282716 A1* 11/2010 Ananthanarayanan ......................
                                                                    B23K 11/115
                                                                    219/86.1

FOREIGN PATENT DOCUMENTS

| CN | 101579779 A |   | 11/2009 |   |   |
| DE | 10 2012 106 378 | * | 1/2014 | ............. | B23K 11/16 |
| GB | 1 548 226 | * | 7/1979 | ............. | B23K 11/10 |

* cited by examiner

Primary Examiner — Michael P Ferguson

(57) ABSTRACT

A system for spot welding two metal sheets together includes a plurality of conductive particles placed in an interface between the two metal sheets, a first electrode, and a second electrode. The first electrode and the second electrode are arranged to clamp the two metal sheets together such that the conductive particles become embedded into the metal sheets at the interface between the metal sheets. A conductive path is formed from the first electrode to the second electrode through the metal sheets and the plurality of metallic particles.

10 Claims, 1 Drawing Sheet

SPOT WELDING

FIELD

Figure 1:
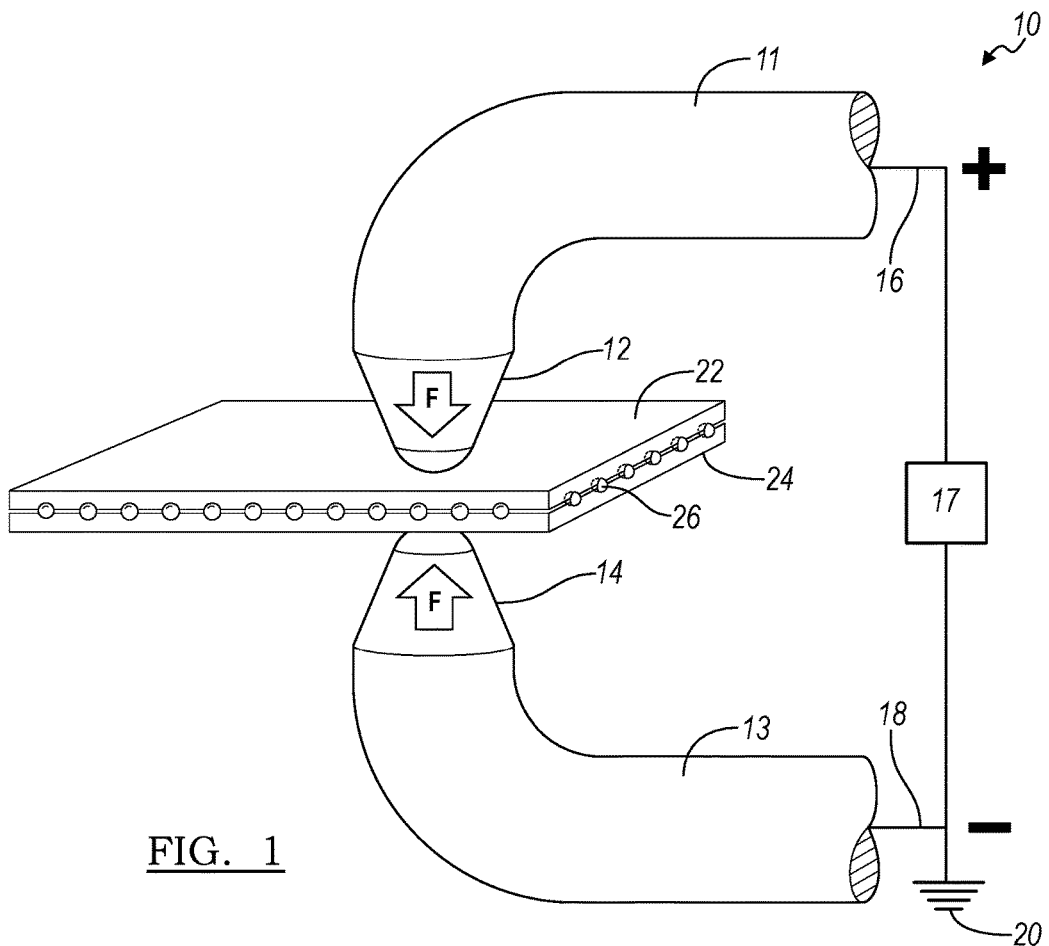

The present disclosure relates to relates to welding. More specifically, the present disclosure relates to resistance spot welding.

BACKGROUND

The statements in this section merely provide background information related to the present disclosure and may or may not constitute prior art.

In a typical spot welding system, opposing electrodes pass current pass through a pair of metal sheets to be welded together. The electrodes are also employed to hold or clamp the sheets during the welding process. In this arrangements, there are three sources of electrical resistance: i) resistance arising from the resistivity of the material; ii) contact resistance at each electrode-sheet interface; and iii) contact resistance at between the two sheets (known as the faying surface). Additional current paths may form through previously made welds (known as shunt welds).

If the contact resistance at the faying surface is below a desired threshold, the rate of heating required to form a weld may not be high enough because of the high electrical and thermal conductivity of the metal. If, however, the contact resistance at the faying surface is too high, excess current may be diverted to the shunt welds and, further, the weld may exhibit metal rupture.

Accordingly, there is a need for a more efficient spot welding process.

SUMMARY

The present invention provides a system for spot welding two metal sheets together. The system includes a plurality of conductive particles placed in an interface between the two metal sheets, a first electrode, and a second electrode. The first electrode and the second electrode are arranged to clamp the two metal sheets together such that the conductive particles become embedded into the metal sheets at the interface between the metal sheets. A conductive path is formed from the first electrode to the second electrode through the metal sheets and the plurality of metallic particles.

The system may be further characterized by one or any combination of the features described herein, such as: the metal sheets are formed of aluminum; the first electrode and the second electrode are connected to an energy source that generates an electrical current; the conductive particles are metallic; the conductive particles are made conductive metals and/or alloys of these metals such as aluminum, copper, iron, nickel, as well as steel and stainless steel; the conductive particles are microspheres; the conductive particles are added to an adhesive layer that is placed between the two metal sheets; the conductive particles break through the adhesive layer when the two metal sheets are clamped together; and the hardness of the conductive particles is greater than the hardness of the metal sheet.

Pursuant to another aspect of the invention, a spot weld includes a first metal sheet, a second metal sheet, and a plurality of conductive particles placed between the metal sheets. The conducive particles become embedded into the metal sheets when the metal sheets are clamped together such that a conductive path forms between the metal sheets through the conductive particles.

The spot weld may be further characterized by one or any combination of the features described herein, such as: the metal sheets are formed of aluminum; the conductive particles are metallic; the conductive particles are made of an aluminum alloy; the conductive particles are microspheres; the conductive particles are added to an adhesive layer that is placed between the two metal sheets; the conductive particles break through the adhesive layer when the two metal sheets are clamped together; and the hardness of the conductive particles is greater than the hardness of the metal sheet.

Pursuant to yet another aspect of the present invention, there is contemplated a method of spot welding including one or more of the following steps: placing a plurality of conductive particles between the two metal sheets; clamping the metal sheets together with a pair of electrodes, the conductive particles being embedded into the metal sheets, an electrically conductive path being formed between the two metal sheets through the conducive particles; and supplying a current that flows from one electrode to the other electrode through the metal sheets and the conductive particles to generate spot welds.

The method of spot welding may be further characterized by one or any combination of the features described herein, such as: the conductive particles are added to an adhesive layer that is placed between the two metal sheets, the conductive particles breaking through the adhesive layer when the two metal sheets are clamped together; and the hardness of the conductive particles is greater than the hardness of the metal sheet.

Further areas of applicability will become apparent from the description provided herein. It should be understood that the description and specific examples are intended for purposes of illustration only and are not intended to limit the scope of the present disclosure.

DRAWINGS

Figure 2:
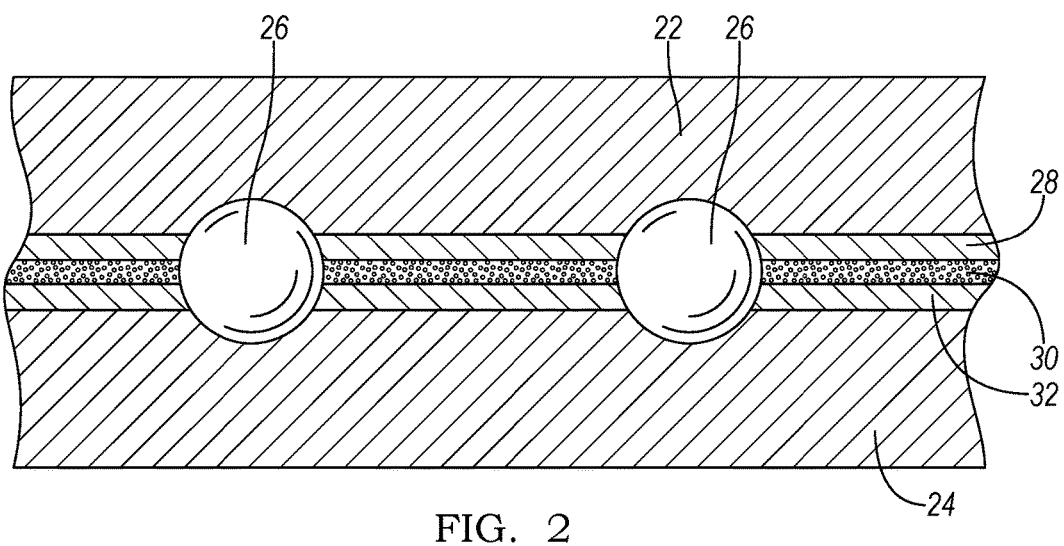

The drawings described herein are for illustration purposes only and are not intended to limit the scope of the present disclosure in any way. The components in the figures are not necessarily to scale, emphasis instead being placed upon illustrating the principles of the invention. In the drawings:

FIG. 1 shows a system for spot welding two sheets of metal in accordance with the principles of the present invention; and FIG. 2 shows a close-up cross-section view of the two sheets fo metal shown in FIG. 1.

DETAILED DESCRIPTION

The following description is merely exemplary in nature and is not intended to limit the present disclosure, application, or uses.

With reference to FIG. 1, a system for spot welding embodying the principles of the present invention is shown therein and designated at 10. The system 10 includes a positive conductor 11 and a negative conductor 13 connected to an energy source 17 with, for example, with leads 16 and 18, respectively. The energy source 17 may be connected to ground 20.

Each conductor 11 and 13 includes a terminal end 12 and 14, respectively, that are arranged to make contact with a pair of metal sheets 22 and 24. The metal sheets can be made, for example, from aluminum or any other suitable metal to be welded together.

During the welding of the two metal sheets 22 and 24, a force, F, is imparted by each conductor 11 and 13 at their terminal ends 12 and 14 to clamp the two sheets together. Hence, in this arrangement the positive conductor 11 and the negative conductor 13 are configured as positive and negative electrodes. Together with the energy source 17 and the metal sheets 22 and 24, the electrodes 11 and 13 form a complete electrical circuit. The electrodes 11 and 13 may be copper electrodes. In various arrangements, the electrodes 11 and 13 are water cooled during the welding process.

During the welding of the metal sheets 22 and 24, electrical resistance arises from: resistance of the metal sheets 22 and 24; contact resistance between the terminal end 12 and the metal sheet 22; contact resistance between the terminal end 14 and the metal sheet 24; and contact resistance at the interface (faying surface) between the metal sheets 22 and 24.

To enhance the current path through the faying surface (that is, lower the contact resistance between the interface between the metal sheets 22 and 24), a plurality of conductive metallic particles 26 (for example, micro-spheres) are added between the two metal sheets 22 and 24 as shown in FIG. 2. The hardness of the metallic particles 26 is selected to be greater than the hardness of the metal sheets to be joined together by the spot welding system 10. For example, if the metal sheets 22 and 24 are made of aluminum, the metallic particles can be made from conductive metals and/or alloys of these metals such as aluminum, copper, iron, nickel, as well as steel and stainless steel. In a particular arrangement, the metallic particles are made of aluminum 6061. Hence, as the electrodes 11 and 13 clamp the two metal sheets 22 and 24 together, the metallic particles 26 become embedded into each metal sheet 22 and 24. The size of the metallic particles 26 is selected insure that the metallic particles 26 provide a conductive path from one metal sheet to the other. Further, the concentration of the metallic particles 26 is selected to insure that an adequate number of conductive paths are available between the welding terminal ends 12 and 14.

In various arrangements, the metallic particles 26 are added to a metal bonding adhesive 30 placed between the metal sheets 22 and 24. Further note, an oxide layer 28 may form on the metal sheets 22 and 24, and/or a pretreatment layer 32 may coat the metal sheets 22 and 24. Hence, the metallic particles 26 break through the adhesive layer 30, any oxide layer 28 and any pretreatment layer 32 that may exist between the metal sheets 22 and 24 to enhance the conductive path for the weld current through the metal sheets 22 and 24.

The description of the invention is merely exemplary in nature and variations that do not depart from the gist of the invention are intended to be within the scope of the invention. Such variations are not to be regarded as a departure from the spirit and scope of the invention.

What is claimed is:

1. A system for spot welding, the system comprising:
   two metal sheets, each metal sheet having an inner face the opposing inner face of the other metal sheet, one of the metal sheets comprising an oxide layer disposed on its inner face and the other metal sheet comprising a pretreatment layer disposed on its inner face;
   a plurality of conductive particles placed in an interface between the two metal sheets, the conductive particles being microspheres added to an adhesive layer that is placed between the two metal sheets, wherein the hardness of the conductive particles is greater than the hardness of the metal sheets;
   a first electrode;
   a second electrode, the first electrode and the second electrode being arranged to clamp the two metal sheets together and to supply a current that flows from one electrode to the other electrode through the metal sheets and the conductive particles to generate spot welds,
   wherein the conductive particles are embedded into the metal sheets at the interface between the metal sheets when the sheets are clamped together, the conductive particles retaining their microsphere shape when embedded into the metal sheets such that the conductive particles break through the adhesive layer and the oxide layer and the pretreatment layer disposed on the meatal sheets when the two metal sheets are clamped together to enhance a conductive path formed between the metal sheets through the conductive particles.

2. The system of claim 1 wherein the metal sheets are formed of aluminum.

3. The system of claim 1 wherein the first electrode and the second electrode are connected to an energy source that generates an electrical current.

4. The system of claim 1 wherein the conductive particles are metallic.

5. The system of claim 1 wherein the conductive particles are made of aluminum.

6. A spot weld comprising:
   a first metal sheet;
   a second metal sheet, each metal sheet having an inner face facing the opposing inner face of the other metal sheet, one of the metal sheets comprising an oxide layer disposed on its inner face and the other metal sheet comprising a pretreatment layer disposed on its inner face; and
   a plurality of conductive particles placed between the metal sheets, the conductive particles being microsphere added to an adhesive layer that is placed between the two metal sheets, wherein the hardness of the conductive particles is greater than the hardness of the metal sheets,
   wherein the conductive particles are embedded into the metal sheets when the metal sheets are clamped together with a pair of electrodes, the conductive particles retaining theft microsphere shape when embedded into the metal sheets such that the conductive particles break through the adhesive layer and the oxide layer and the pretreatment layer disposed on the two metal sheets when the two metal sheets are clamped together to enhance a conductive path formed between the metal sheets through the conductive particles.

7. The spot weld of claim 6 wherein the metal sheets are formed of aluminum.

8. The spot weld of claim 6 wherein the conductive particles are metallic.

9. The spot weld of claim 8 wherein the conductive particles are made of aluminum, copper, iron, or nickel or alloys of these metals.

10. A method of spot welding two metal sheets, the method comprising:
    providing each metal sheet with an inner face facing the opposing inner face of the other metal sheet, one of the metal sheets comprising an oxide layer disposed on its inner face and the other metal sheet comprising a pretreatment layer disposed on its inner face;
    placing a plurality of conductive particles between the two metal sheets, the conductive particles being microspheres added to an adhesive layer that is placed between the two metal sheets, wherein the hardness of the conductive articles is greater than the hardness of the metal sheets;

clamping the metal sheets together with a pair of electrodes, the conductive particles being embedded into the metal sheets when the metal sheets are clamped together, the conductive particles retaining their microsphere shape when embedded into the metal sheets such that the conductive particles break through the adhesive layer and the oxide layer and the pretreatment layer disposed on the two metal sheets when the two metal sheets are clamped together to enhance an electrically conductive path formed between the two metal sheets through the conducive particles; and supplying a current that flows from one electrode to the other electrode through the metal sheets and the conductive particles to generate spot welds.

\* \* \* \* \*